Figure 5:
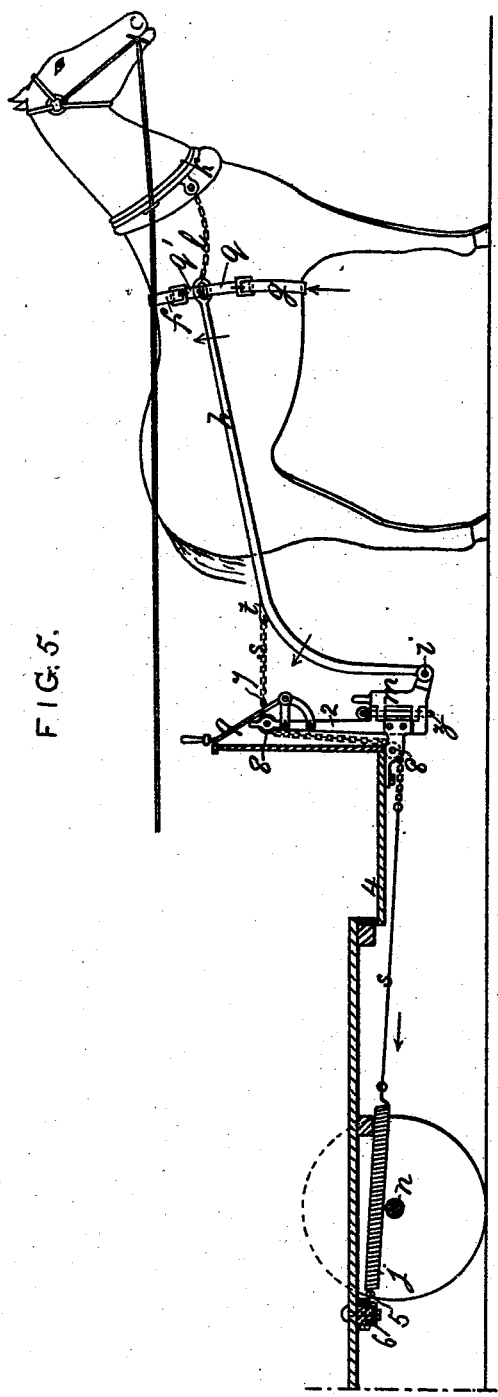

(No Model.) 4 Sheets—Sheet 1.
T. H. BRIGG.
MEANS FOR CONNECTING DRAFT ANIMALS TO VEHICLES.
No. 517,641. Patented Apr. 3, 1894.
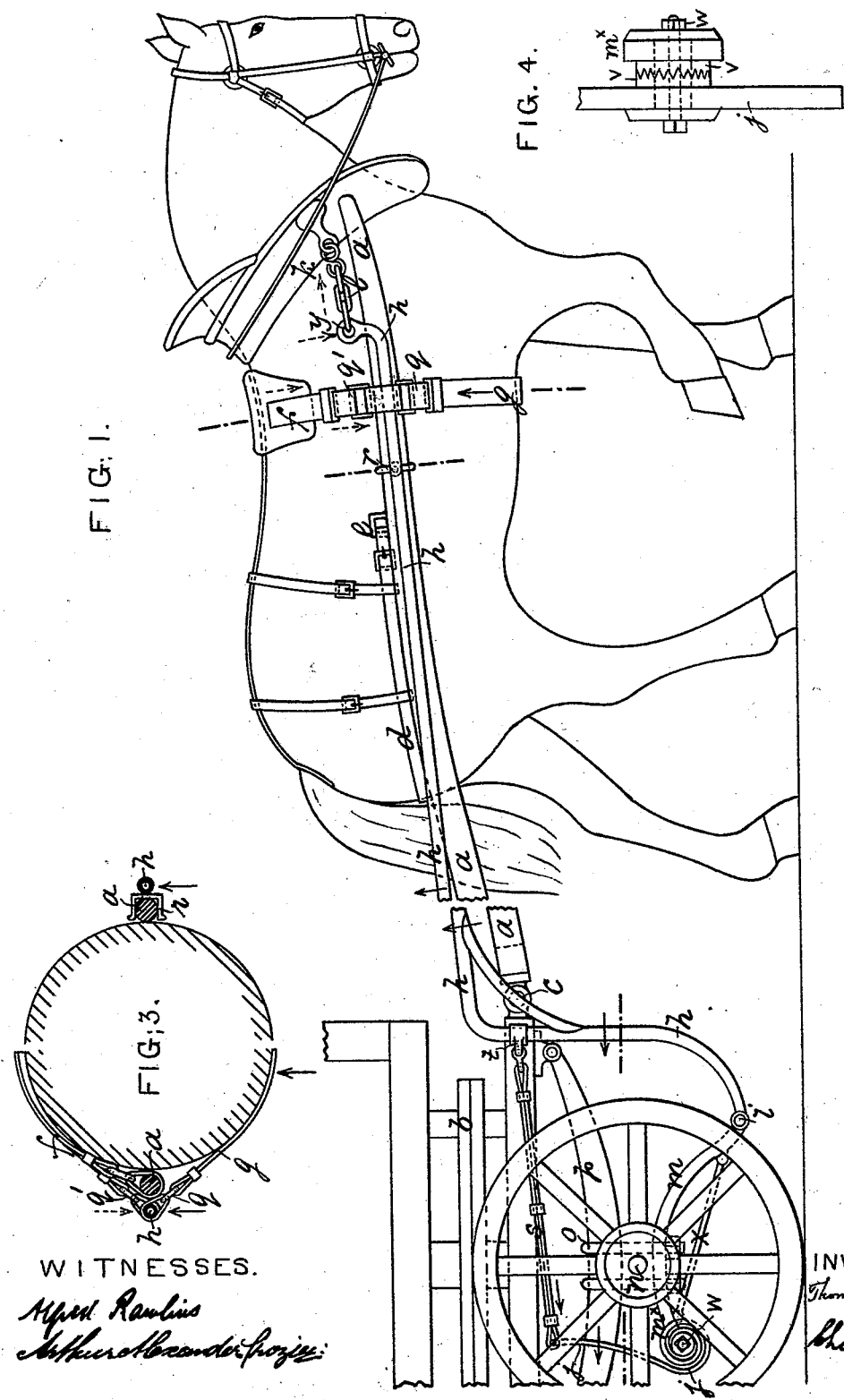
WITNESSES.
*Alfred Rawlins*
*Arthur Alexander Frazier*
INVENTOR.
*Thomas H. Brigg*
by *Charles A. Day*
Attorney.
THE NATIONAL LITHOGRAPHING COMPANY,
WASHINGTON, D. C.

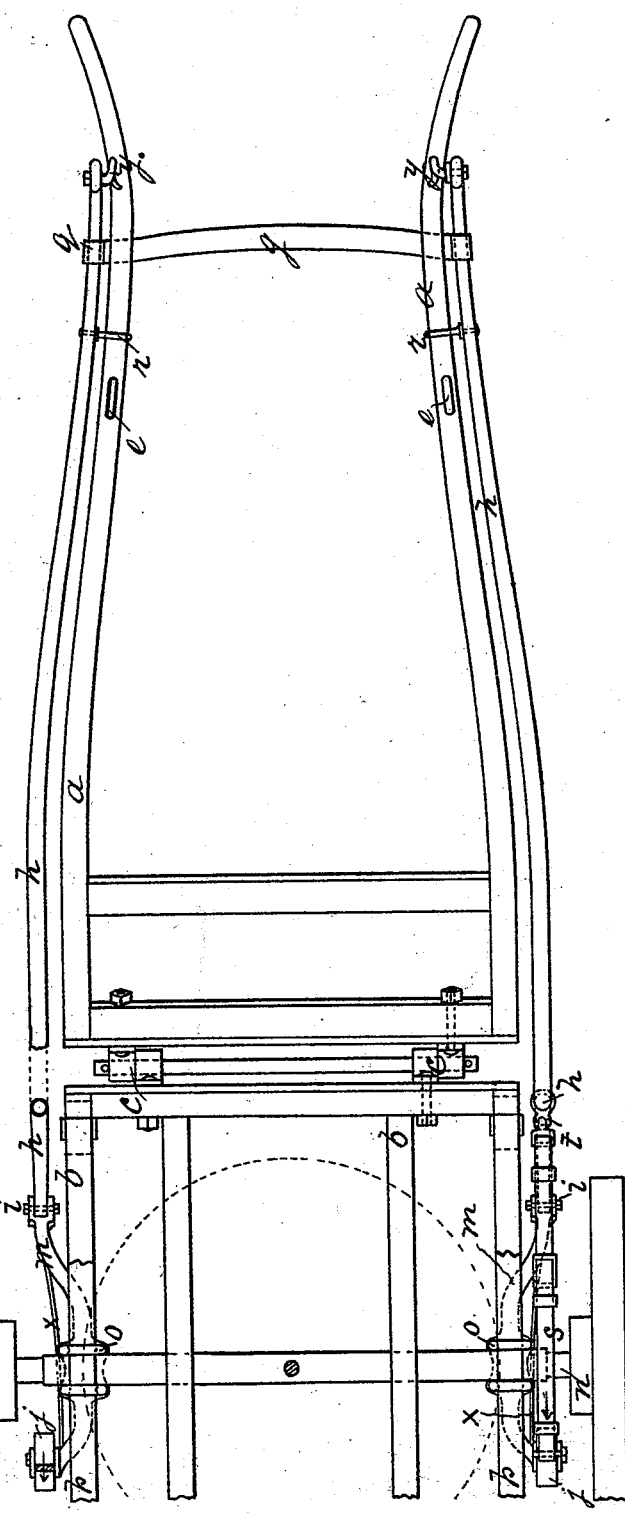

(No Model.) 4 Sheets—Sheet 3.

T. H. BRIGG.
MEANS FOR CONNECTING DRAFT ANIMALS TO VEHICLES.

No. 517,641. Patented Apr. 3, 1894.

WITNESSES.
Alfred Rawlins
Arthur Alexander Crozier

INVENTOR.
Thomas Hargreaves Brigg
by Charles Aubrey Day
Attorney.

(No Model.) 4 Sheets—Sheet 4.
T. H. BRIGG.
MEANS FOR CONNECTING DRAFT ANIMALS TO VEHICLES.
No. 517,641. Patented Apr. 3, 1894.
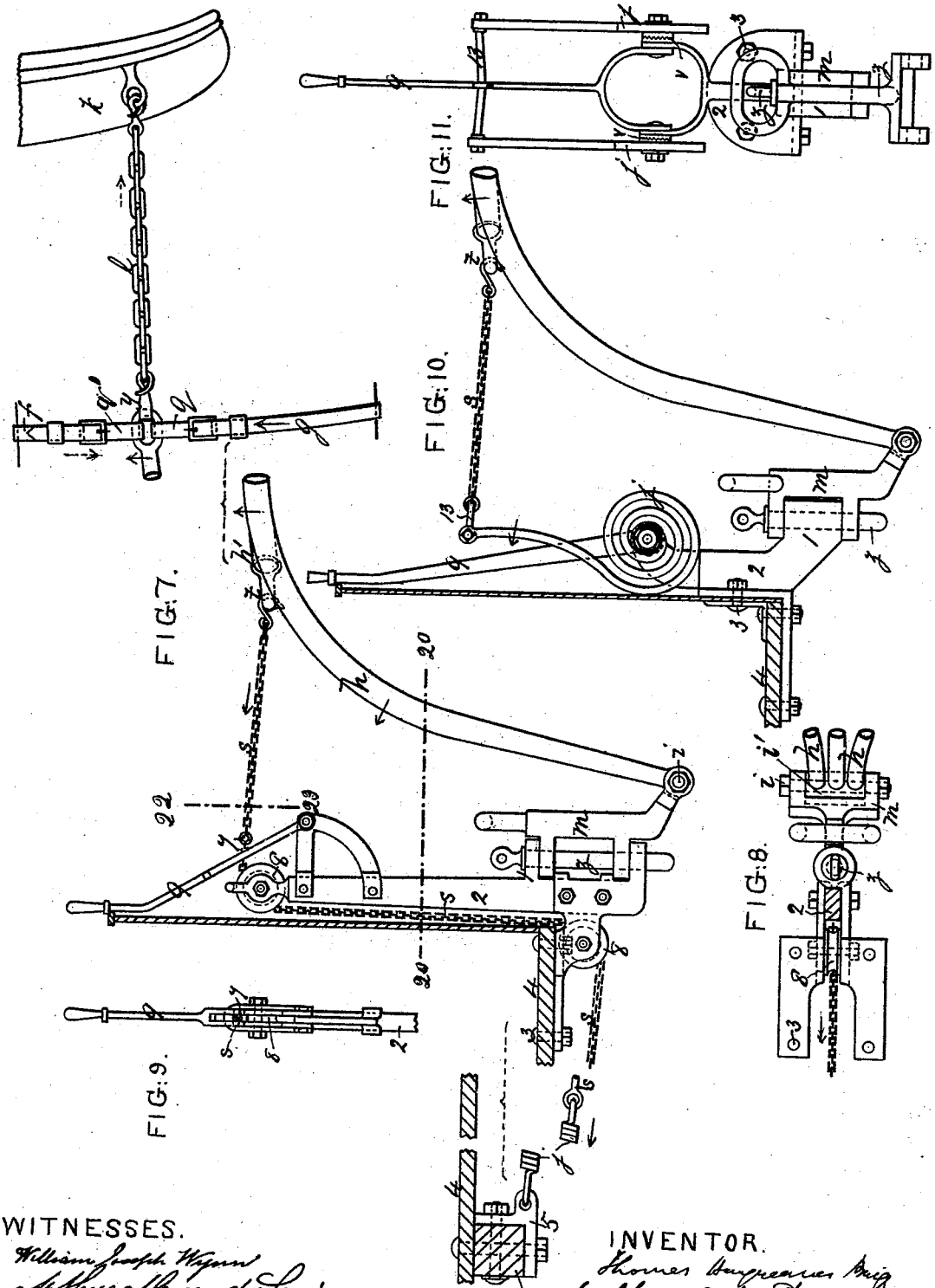
WITNESSES.
INVENTOR.

UNITED STATES PATENT OFFICE.

THOMAS HARGREAVES BRIGG, OF BRADFORD, ENGLAND.

MEANS FOR CONNECTING DRAFT-ANIMALS TO VEHICLES.

SPECIFICATION forming part of Letters Patent No. 517,641, dated April 3, 1894.

Application filed September 12, 1893. Serial No. 485,366. (No model.)

*To all whom it may concern:*

Be it known that I, THOMAS HARGREAVES BRIGG, of Bradford, Yorkshire, England, have invented certain Improved Means for Connecting Draft-Animals to Vehicles, of which the following is a specification.

This invention relates to a development of the inventions relating to improved means of connecting draft animals to vehicles, ground implements, sleighs and the like having fore and aft axles and wheels or other fore and aft bearings upon the ground, for which Letters Patent No. 439,468, dated the 28th day of October, 1890, and No. 486,837, dated the 22d day of November, 1892, were granted to me; the present improvements preserving all the advantages pertaining to the improved systems of connection described in the specifications of such patents in obtaining the desired continuous automatic relation between the work required to be done by the connected draft animal and the necessary expenditure of the animal's energy to perform such work, common to both of such systems, and also those pertaining to the means of supporting and affording relief to the animal peculiar to the later of such systems, while avoiding certain disadvantages in relation to the turning and backing of the vehicle in respect of the earlier of such systems, and in relation to the liability of the animal kicking or stepping over the downwardly inclined and lowly connected traces in respect of the later of such systems. With the present improved means of connection, when applied to a vehicle fitted with a fore-carriage, either shafts or a pole are or is connected to the fore-carriage in a usual manner, so that the steering and backing of the vehicle can be effected thereby in an ordinary manner, but such shafts and pole are or is not used either for the purpose of effecting an occasional downward pressure upon the animal's fore quarters as in the said former system, or for the purpose of effecting a constant supporting tendency at the animal's fore quarters as in the said later system; and in lieu of the spring-controlled trace-levers and co-operating shaft-levers of the said former system, and of the fore quarter supporting devices and downwardly inclined and lowly connected traces of the said later system, I use in accordance with the present improvements, in obtaining the aforesaid advantages, a novel combination of co-operating devices as hereinafter described.

Figure 6:
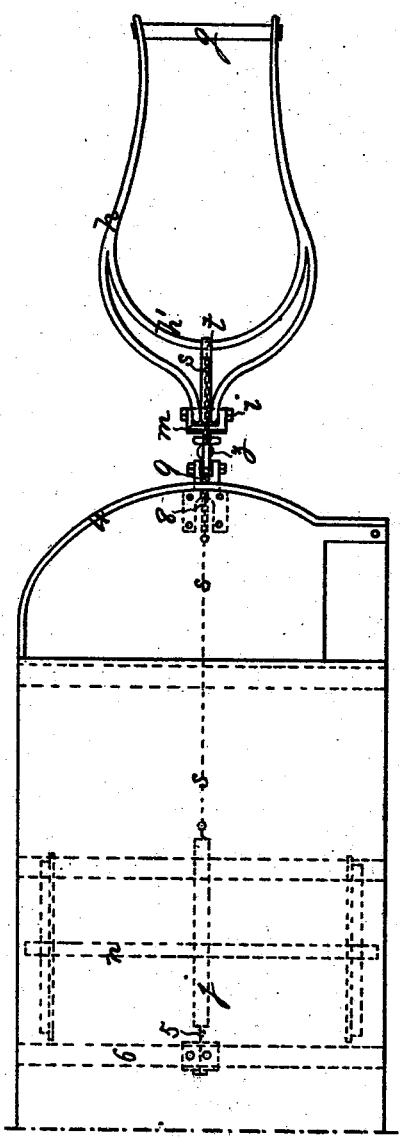

In the accompanying drawings:—Figure 1, represents in side elevation, the fore part of a two axled wheeled vehicle having a fore-carriage and ordinary shafts, showing the same as connected to a draft animal by means of the improved draft device. Fig. 2, represents a plan view of the same partly in section on the line 14, 15, Fig. 1, with the body part of the vehicle and the draft animal removed. Fig. 3, represents a section partly on the line 16, 17 and partly on the line 18, 19 Fig. 1. Fig. 4, is an enlarged detail view. Figs. 5 to 11, illustrate the application of the improved draft device to a tram-car not having a fore carriage or requiring shafts or a pole. Fig. 5, represents one half length of the floor of the car in section, with the draft device and connected animal (not in draft) in side elevation. Fig. 6, represents a plan view thereof, with the animal removed. Fig. 7, represents an enlarged side elevation, partly in section, with parts of the device broken and closed together, but occupying their relative positions of elevation. Fig. 8, is a sectional plan on the line 20—21 Fig. 7, not representing the car frame. Fig. 9, is a sectional front elevation on the line 22—23 of the part above the line 20—21 Fig. 7, not representing the car frame. Fig. 10, is a sectional side elevation of a modification. Fig. 11, is a front elevation with the trace levers removed.

Like reference letters and numerals indicate like parts wherever they are repeated on the drawings.

*a*, represents ordinary shafts, which are pivotally connected to the fore-carriage *b*, at *c*, and are connected to a breech-strap *d*, at *e*, and are supported from the back-band or a saddle *f*, in any usual manner, without being connected to the belly-band *g*.

For each draft animal I use a draft device consisting of a pair of separate or connected rigid arched trace-levers *h*, with their ends disposed in a downwardly inclined plane or planes relative to flexible connections to the animal at the hame or collar, and which, (at their rear ends) are pivotally connected to the fore-carriage *b*, or equivalent part of the vehicle at as low points $i$, as convenient, and (at or toward their forward ends) are connected to the animal by means of a belly-band $g$, and a back-band $f$, and (at any convenient part of their intermediate arched parts) are connected to the fore-carriage by means of spring or equivalent attachments $j$, so applied as to normally tend to raise the forward ends of the levers, and the belly-band, and to support the fore-quarters of the connected animal—and (at any convenient parts of such arched parts or at or forward of the connections to the belly-band and back-band) are also connected to the animal at the hame or collar $k$, by means of trace connections $l$, so applied as to normally occupy an ordinary inclination or position, (such as that of ordinary traces connected directly from the hame or collar to the ordinary trace-hooks of a fore-carriage, and as distinguished from the downwardly inclined and lowly connected traces of the aforesaid later system) and as when in tension, to tend to draw the ends of the trace-levers into alignment with the attachments to the hame so as to variably counteract said supporting tendency of the spring attachments effected through the trace-levers and belly-band in the ratio of the pull exerted by the animal through the traces. The trace-levers $h$, may be separate and independent (vide Figs. 1 and 2) or may be connected together so as to co-operate (vide Figs. 5, 6, 7, 8 and 10) and they may be constructed of bent metal tubing, or of bent metal rods, or of bent wood, or of any other suitable material, being made of a rigid, arched formation provided with suitable means of connection at and to the parts aforesaid. The aforesaid connections of the trace-levers to a fore-carriage at the points $i$, may be effected by brackets $m$, (vide Fig. 1) depending from and in advance of the fore-axle $n$, and secured thereto by the clips and bolts $o$, securing the usual fore-carriage supporting springs $p$, or in any other suitable manner. The aforesaid connections of the trace-levers to the animal at the belly band are effected by adjustable straps and buckles $q$, or like means directly connected to the belly-band at the sides of the animal, see Figs. 1, 2, 3, 5 and 7, entirely independent of and without any connection to the shafts should the vehicle be fitted therewith, vide Figs. 1 and 3. Or, such parts of the levers may be connected together over the animal's back and attached to a belly-band by depending straps or like means. The aforesaid connections of the levers to the back-band or saddle may also be effected directly in like manner by adjustable straps and buckles $q'$ or like means, vide Figs. 5 and 7. Or, such latter connections, in vehicles having shafts, may be effected through the shafts, vide Figs. 1 and 3 the levers being fitted with swiveling forks $r$, adapted to engage with and support the shafts, so as to relieve the animal of supporting the weight thereof and as to raise the shafts when the animal is disconnected without in any way operating on the belly-band through the shafts.

The aforesaid connections of the trace-levers to the spring attachments $j$ may be effected by adjustable straps $s$, connecting the free ends of the springs and eyes $t$, fitted to the levers, or in any other suitable manner.

The springs $j$, are preferably made of a coiled formation and applied in an adjustable manner, vide Fig. 4, in which the spring is represented as formed with a squared center $u$, set on the squared hub of one of a pair of clutch plates $v$ the squared hub of the other of which plates is set in and carried by a rearward extension $m^x$, of the bracket $m$, the whole being secured by a bolt and nut $w$. When desired to adjust the supporting power of the springs, the nuts $w$, are loosened to permit of separation of the clutch-plates $v$, and of the springs being taken up or let out as required, whereupon, the parts are again secured by tightening up the nuts. The fore and aft parts of the bracket $m$, $m^x$, may be stayed by a rod $x$. The springs $j$, may, however, be of any other suitable formation (vide Figs. 5 and 7 hereinafter referred to) and may be applied in any other convenient manner. The aforesaid connections of the trace-levers to the animal at the hame or collar $k$, are, as aforesaid, effected by trace connections $l$, which so far as they extend occupy a normal inclination or position, as also aforesaid, the same being connected to the hame or collar in a usual manner and to trace-hook $y$, or other suitable trace attachments applied to the trace-levers $h$, at any suitable parts, either forward of the connections of the levers to the belly-band, as represented in Fig. 1, or at such connections as represented in Figs. 5 and 7, or rearward thereof.

In the arrangements represented in Figs. 5 to 8, 10 and 11 the trace-levers are connected together at their ends $i$, by a broad tubular boss $i'$, (Fig. 8) and are there pivotally attached to a removable support $m$, which is capable of turning upon a pin $z$ in bearings 1, projecting from the bracket 2, which is bolted at 3, to the car framing 4.

In Figs. 5 to 7, one spring $j$, of a helical formation, is used, being connected at the one end to a hold-fast 5, bolted to a joint 6, of the car-flooring, and at the other end to the center of a bar $h'$ (connecting the trace levers $h$) by a chain, wire-rope or other suitable flexible connection $s$, guided by pulleys 8. The chain or connection $s$, is hooked in a readily removable manner to the eye $t$, fast on the bar $h'$, and is fitted with a projection 7, on the outer side of a lever 9, by which,—when it is desired to disconnect the animal from one end of the car and attach it to the other,—the spring is pulled forward, so as to permit of the hook being disconnected from the eye $t$, the disconnection of the animal being completed by removing the pin $z$, connecting the support $m$, and bracket 2.

In Figs. 10 and 11, two separate springs $j$, of a coiled formation, are used, each being connected to a bent rigid link 13, to which the chain s, is connected.

The directions of the force exerted by the springs j, are indicated on the drawings by arrows drawn in full lines, and of that exerted through the traces b, by arrows drawn in dotted lines.

With the aforesaid improved means of attachment of the animal to the vehicle, when at rest or when not exerting any pull on the traces, (vide Fig. 5,) will be relieved of supporting its own weight to an extent determined by the maximum action of the spring-controlled trace-levers operating through the belly-band;—but, when the animal is in draft, (vide Fig. 1,) such supporting tendency will be counteracted in the ratio of the pull exerted by the animal through the traces, the support afforded by the belly-band being lessened accordingly as the force exerted through the traces counteracts the supporting tendency of the springs, so that, as the vehicle enters on heavier gradients or otherwise encounters increased resistance to traction, more and more of the natural weight of the animal is allowed or caused to become operative, according to the requirements for the time being, until, upon the supporting tendency of the springs being neutralized by the pull effected through the traces, the whole of such natural weight becomes operative; thereupon, any increased pull exerted by the animal, will (owing to the virtual downward inclination of the connection from the hame to the fore-carriage, and to the tendency of the pull effected through the traces to bring the points of attachment of the traces to the trace-levers and to the hame, and of the trace-levers to the fore-carriage, into alignment,) be effective in causing the trace-levers and the traces to exert, through the back-band or its equivalent and the collar, a downward pressure on and well distributed over the animal's forequarters, effective in increasing its natural weight (very considerably when the animal is exerting its maximum pull) and tractive power, enabling it the easier to overcome the resistance if within the limit of its power.

I claim as my invention—

In combination, rigid arched trace-levers having their ends disposed in a downwardly inclined plane or planes relative to flexible connections to the animal at the hame, and their rear ends pivotally connected to a lowly depending part or parts of the fore-carriage or equivalent part of the vehicle,—continuing flexible trace connections tending when in draft to draw the ends of the trace-levers into alignment with the attachments to the hame,—a belly-band connected to the trace levers and adapted to support the animal's forequarters,—a back-band connected to the trace levers and adapted to bring downward pressure on the animal's forequarters,—and a spring or springs connected to the fore-carriage or vehicle and to the arched parts of the trace-levers tending to raise the fore parts of the levers;—the whole co-operating as set forth.

In testimony whereof I have signed my name to this specification in the presence of two subscribing witnesses.

THOMAS HARGREAVES BRIGG.

Witnesses:
HARRY WHARTON,
JOHN FORETIER CRISP.